United States Patent [19]

Goloff

[11] 4,089,306
[45] May 16, 1978

[54] PORT INSULATION FOR INTERNAL COMBUSTION ENGINES

[75] Inventor: Alexander Goloff, East Peoria, Ill.

[73] Assignee: Caterpillar Tractor Co., Peoria, Ill.

[21] Appl. No.: 694,507

[22] Filed: Jun. 9, 1976

[51] Int. Cl.² .............................................. F02B 19/18
[52] U.S. Cl. .................................... 123/32 K; 123/209
[58] Field of Search ............. 123/32 C, 32 D, 32 AA, 123/32 J, 32 K, 32 L, 32 SP, 32 ST, 143 B, 191 S, 191 SP, 8.11, 8.09, 188 S, 193 H; 60/282, 323

[56] References Cited

U.S. PATENT DOCUMENTS

| | | | |
|---|---|---|---|
| 3,044,454 | 7/1962 | Sutton | 123/32 J |
| 3,105,470 | 10/1963 | Hockel et al. | 123/32 D |
| 3,976,036 | 8/1976 | Muroki et al. | 123/8.09 |
| 4,034,723 | 7/1977 | Hamparian | 60/282 X |

FOREIGN PATENT DOCUMENTS

| | | | |
|---|---|---|---|
| 972,406 | 7/1959 | Germany | 123/32 J |
| 1,006,667 | 4/1957 | Germany | 123/32 J |
| 1,069,938 | 11/1959 | Germany | 123/32 AA |
| 379,401 | 9/1932 | United Kingdom | 123/32 K |

*Primary Examiner*—Charles J. Myhre
*Assistant Examiner*—Tony M. Argenbright
*Attorney, Agent, or Firm*—Wegner, Stellman, McCord, Wiles & Wood

[57] ABSTRACT

An internal combustion engine including a housing defining a combustion chamber, a piston movable within the housing, a port in the housing opening into the combustion chamber, a tube within the port having a free end terminating within the port closely adjacent the combustion chamber and an insulator on the exterior of the tube whereby heat flow from the tube to the housing is minimized to preclude thermal distortion thereof in the vicinity of the port.

3 Claims, 1 Drawing Figure

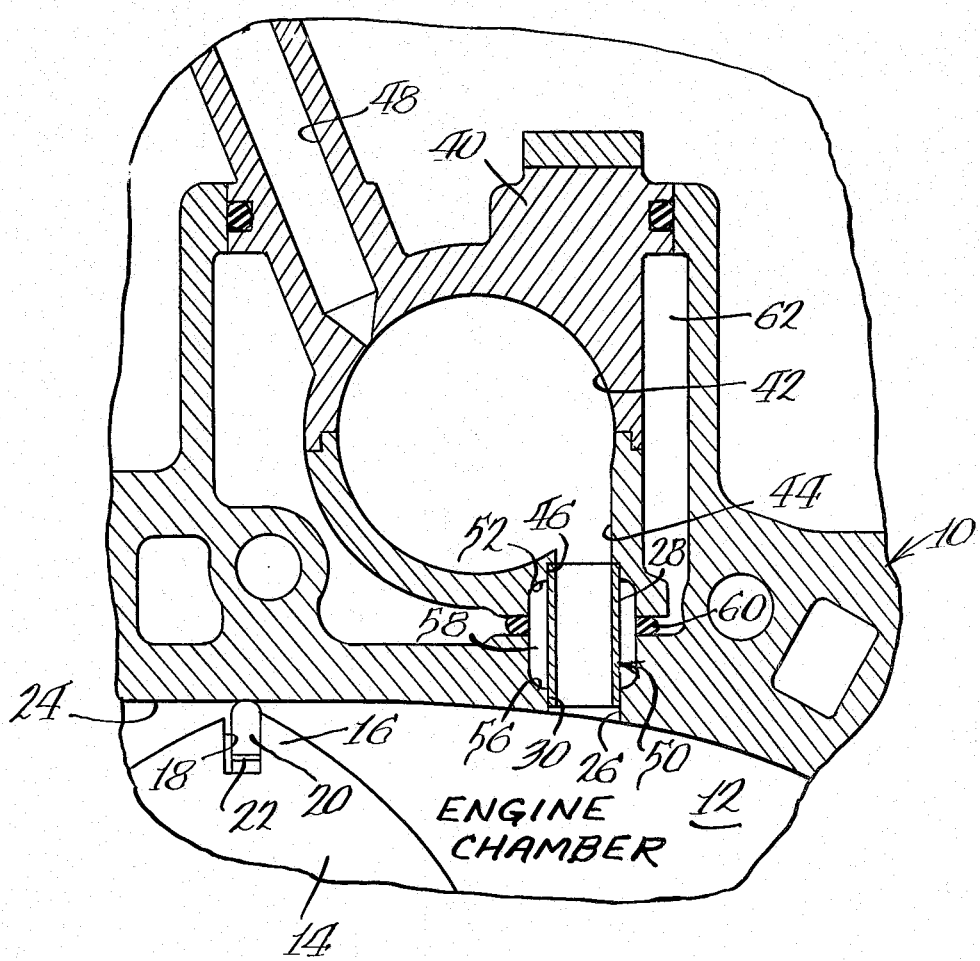

PORT INSULATION FOR INTERNAL COMBUSTION ENGINES

BACKGROUND OF THE INVENTION

This invention relates to internal combustion engines and, more specifically, to improved port constructions for use in such engines.

Rotary, internal combustion engine housings must contain gases and, at the same time, provide geometrically accurate surfaces for the various seals to seal against. In typical engines, such as trochoidal engines, the housings are not structurally symmetrical nor are they loaded symmetrically in either the thermal or mechanical sense.

Ports in such engines which convey hot gases at high velocity pose a particular problem. Such ports typically will be exhaust ports, prechamber or swirl chamber ports. Deviations in geometry at such ports affect gas leakage, and thus engine efficiency, as well as seal life.

Heretofore, numerous attempts have been made to modify theoretical cold engine geometry such that when the engine heats up during operation, the geometry will assume a theoretically perfect shape to eliminate the problem. Such an approach is exemplified by U.S. Pat. No. 3,302,622.

In reciprocating engines employing valves, at exhaust ports, the high heat flux caused by hot gases passing therethrough have been known to cause thermal distortion of valve seats on the order of 0.15 mm. Again, gas leakage may occur, reducing engine efficiency and valve life will be shortened.

SUMMARY OF THE INVENTION

It is the principal object of the invention to provide a new and improved port construction for internal combustion engines, whether of the rotary or the reciprocating type. More specifically, it is an object of the invention to provide such a port construction wherein thermal distortion of the engine housing in the vicinity of ports is minimized to reduce gas leakage and maximize seal or valve life.

An exemplary embodiment achieves the foregoing objects in an internal combustion engine having a housing defining a combustion chamber. A piston is movable within the housing and a port is located in the housing and opening into the combustion chamber. A tube is disposed within the port and has a free end terminating within the port closely adjacent the combustion chamber. Insulation means are disposed on the exterior of the tube and interposed therebetween and the housing so that heat flow from the tube to the housing is minimized. As a consequence, the heating of the housing will be overwhelmingly by hot gases within the combustion chamber and not hot gases passing through the tube. Consequently, the housing will be substantially uniformly heated about the combustion chamber, including in the vicinity of the port so that the housing will not distort in the vicinity of the port.

In one embodiment of the invention, the engine is a rotary engine and the piston is a rotary piston.

In a preferred embodiment of the invention, there is provided a second housing defining a chamber having an outlet. The tube has an end remote from the free end secured to the second housing about the outlet. In general, a fuel injector will be in fluid communication with the second housing chamber.

In a preferred embodiment of the invention, the insulation means includes recesses about the tube in both housings having portions spaced therefrom to define an insulating cavity.

In a highly preferred embodiment, the cavity may comprise a trapped air space or, alternately, may be partially or wholly filled with solid insulation.

Other objects and advantages will become apparent from the following specification taken in connection with the accompanying drawing.

DESCRIPTION OF THE DRAWING

The FIGURE is a fragmentary, sectional view of an internal combustion engine embodying the invention.

DESCRIPTION OF THE PREFERRED EMBODIMENT

An exemplary embodiment of an internal combustion engine made according to the invention is illustrated in the FIGURE in connection with a port from a prechamber employed in a rotary engine, specifically, a trochoidal engine. However, it is to be understood that the invention will find utility in other forms of engines, such as slant axis rotary engines and reciprocating engines, and in connection with ports other than swirl chamber ports as, for example, exhaust ports, whether or not valved.

The engine includes a housing, generally designated 10, defining an engine chamber 12. A rotary piston 14 is disposed in the chamber for planetary movement therein about an eccentric shaft (not shown) of conventional construction. The rotor 14 includes plural apexes 16 (only one of which is shown) each of which is provided with a groove 18 receiving an apex seal 20 and a biasing spring 22. The seal 20 sealingly engages against a wall 24 of the chamber 12.

The housing 10 includes a port 26 opening into the chamber 12. A tube 28 sized to relatively snugly fit within the ports 26 has an end 30 terminating within the port 26 closely adjacent, but not within, the combustion chamber 12. The end 30 of the tube 28 is free and, accordingly, can move somewhat within the port 26 due to thermal expansion and contraction as engine temperatures change.

The engine includes a second housing 40 defining a prechamber 42 having an outlet 44. The end 46 of the tube 28 remote from the end 30 is secured as by welding to the housing 40 about the outlet 44 to conduct gas from the chamber 42 to the chamber 12.

A fuel injector 48 of conventional construction is associated with the chamber 42.

The tube 28 is provided with insulating means, generally designated 50, about the vast majority of its exterior. The insulating means 50 includes a recess 52 in housing 40 about the tube 28, and a recess 56 in the housing 10, also about the tube 28 to define an insulating cavity 58. If desired, the insulating cavity 58 may merely comprise a trapped air space. Alternately, solid insulation may be disposed therein.

A seal 60, typically of soft iron, is disposed about the sheath 52 and is sandwiched between the housings 10 and 40.

From the foregoing, it will be appreciated that hot gases passing through the tube 28 will heat the same substantially. However, heat flow from the tube 28 to the housing 10 in the vicinity of the port 26 will be minimal by reason of the presence of the insulating means 50. To a lesser extent, the fact that the end 30 of the tube 28 is not secured to the housing 10 will assist in minimizing heat transfer insofar as the loose connection will result in lesser heat flow than a fixed connection.

As a consequence, it will be appreciated that the wall 24 will be substantially uniformly heated by the gases within the chamber 12 and that such uniform heating will occur even in the vicinity of the port 26 since the housing 12 will not be appreciably heated in the vicinity of the port 26 by hot gases passing through the tube 28 due to the presence of the insulating means 50. Thus, localized distortions present in prior art apparatus in the vicinity of the port 26 are minimized or eliminated. Consequently, in a rotary engine of the type shown, seal leakage and wear is minimized.

It will also be appreciated that if the invention is employed in connection with valved exhaust ports in reciprocating engines, distortion of valve seats will similarly be minimized with a resulting increase in engine efficiency and lengthening of valve life.

What is claimed is:

1. In an internal combustion engine, the combination of:
    a housing defining a combustion chamber;
    a piston movable within said housing;
    a port in said housing and opening into said chamber;
    a tube within said port having a free end snugly received by and movable within said port closely adjacent said combustion chamber;
    insulating means on the exterior of said tube whereby heat flow from said tube to said housing is minimized; and
    a second housing defining a chamber having an outlet;
    said tube having an end remote from said free end and secured to said second housing about said outlet.

2. In an engine, the combination of:
    a housing defining a first chamber;
    a piston movable within said first chamber;
    a port in said housing opening into said first chamber;
    a recess in said housing about said port and remote from said first chamber;
    a second chamber having an outlet;
    a tube secured to said chamber outlet and extending through said recess and having a free end snugly received by and movable within said port closely adjacent said first chamber; and
    a seal abutting said housing about said recess and said second chamber about said outlet,
    said seal, said recess, said tube and said second chamber defining a substantially closed, annular, insulating recess about said tube to minimize heat flow from said tube to said housing.

3. The engine of claim 2 wherein said second chamber is defined by a second housing and further including an additional recess in said second housing about said outlet and said tube.

* * * * *